United States Patent
Nuss et al.

(10) Patent No.: US 11,518,282 B2
(45) Date of Patent: Dec. 6, 2022

(54) MOTOR-VEHICLE ACCESSORY

(71) Applicants: Ralph Nuss, Poppenricht (DE); Rainer Schollenberg, Kaiserslautern (DE)

(72) Inventors: Ralph Nuss, Poppenricht (DE); Rainer Schollenberg, Kaiserslautern (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 17/069,403

(22) Filed: Oct. 13, 2020

(65) Prior Publication Data

US 2021/0138946 A1 May 13, 2021

(30) Foreign Application Priority Data

Nov. 8, 2019 (DE) .......................... 102019130254.4

(51) Int. Cl.
- *F16C 17/02* (2006.01)
- *B60N 2/75* (2018.01)
- *B60N 3/00* (2006.01)

(52) U.S. Cl.
CPC .............. *B60N 2/763* (2018.02); *B60N 2/79* (2018.02); *B60N 3/001* (2013.01); *F16C 17/02* (2013.01)

(58) Field of Classification Search
CPC .......... B60N 2/763; B60N 2/767; B60N 2/77; B60N 2/773; B60R 7/04
USPC ..................................... 296/153, 1.09, 24.34
See application file for complete search history.

(56) References Cited

U.S. PATENT DOCUMENTS

| | | | | |
|---|---|---|---|---|
| 5,979,987 A | * | 11/1999 | Rich | B60N 2/763 297/DIG. 6 |
| 2004/0080173 A1 | * | 4/2004 | Niwa | B60N 2/773 296/1.09 |
| 2005/0006942 A1 | | 1/2005 | Bremner | |
| 2018/0222365 A1 | * | 8/2018 | Shimizu | B60N 3/00 |
| 2019/0082851 A1 | * | 3/2019 | Nuss | B60N 2/753 |

FOREIGN PATENT DOCUMENTS

| | | | | |
|---|---|---|---|---|
| DE | 19915469 A1 | * | 10/2000 | ........... B60N 2/4633 |
| DE | 102008006714 A1 | | 8/2009 | |
| FR | 2698594 A1 | * | 6/1994 | ........... B60N 2/4626 |
| JP | 6446482 B2 | * | 12/2018 | |
| KR | 20180076168 A | * | 7/2018 | |
| WO | 2008/037067 A1 | | 4/2008 | |

OTHER PUBLICATIONS

Machine translation of JP 6446482.*

* cited by examiner

*Primary Examiner* — D Glenn Dayoan
*Assistant Examiner* — Kevin P Weldon
(74) *Attorney, Agent, or Firm* — Andrew Wilford

(57) ABSTRACT

An armrest has a base, a sliding part movable translationally relative to the base between a first end position and a second end position, and first and second guides on base. One of the guides has a first bearing and a second bearing at least one of which is pivotal in a respective bearing seat. The other guide has a first guide bar and a second guide bar spaced apart in a movement direction and movable jointly in the movement direction relative to the respective first and second bearings. The first guide bar extends in a straight line along a first longitudinal axis and the second guide bar in a straight line along a second longitudinal axis. The first longitudinal axis and/or the second longitudinal axis extends at an angle to a straight line extending through a center of the first bearing and a center of the second bearing.

10 Claims, 7 Drawing Sheets

MOTOR-VEHICLE ACCESSORY

Figure 1:
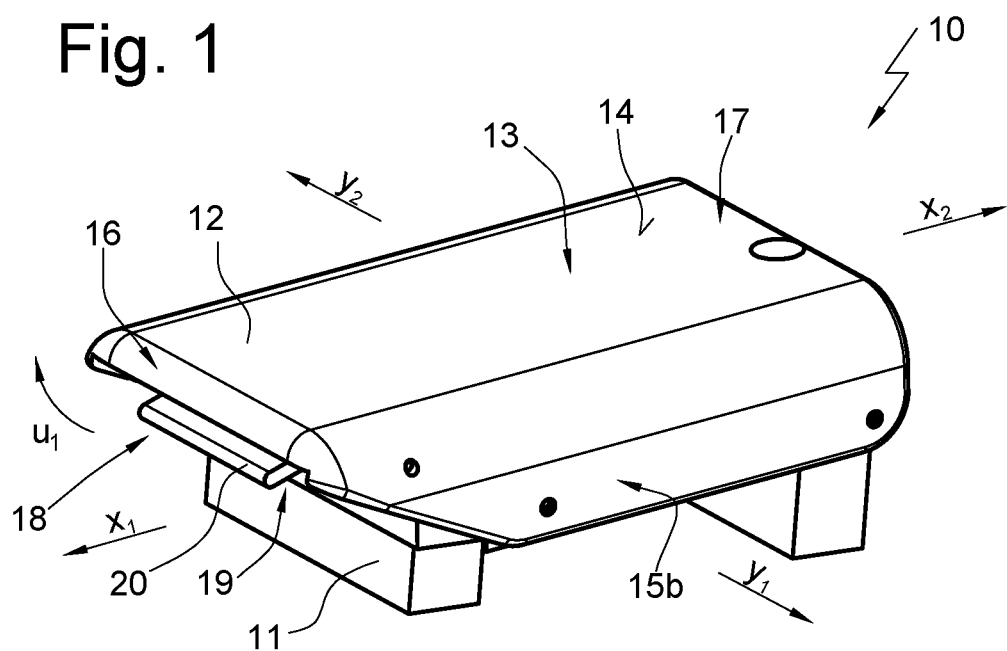

The invention relates to an accessory of a vehicle.

The accessory comprises a base and a sliding part movable relative to the base. The sliding part is guided on the base by a guide device. The guide has a first guide means on the base and second guide means on the sliding part.

An accessory of this kind is for example an armrest or a central console comprising a movable arm support for a vehicle seat. An armrest known from public prior use has a first guide means in the form of a first bearing element and a second bearing element opposite the first bearing element. For example, second guide unit in the form of a bar of the sliding part, such as an arm support of an armrest, is translationally movably guided between the two bearing elements.

Cylindrical tubular guides that interact with second guide unit in the form of complementary receptacles and form a linear guide are also used in armrests as first guide unit.

Furthermore, additionally or alternatively to a linear guide of this kind, guides are also used in which the base is connected to the sliding part by at least one link at the front and at the rear in the movement direction, such that a four-bar link is formed by the base, the links and the sliding part.

The options for freely specifying a movement sequence of the sliding part with different inclinations of the longitudinal axis in the different positions were limited by guides of this kind.

The object of the invention was to provide an accessory comprising a sliding part that was movable in a straight line relative to a base, the sliding part implementing particular movement characteristics. The sliding part is intended not only to be movable in the sliding direction forward and backward, but also to be movable vertically. Nevertheless, the manufacturing complexity of the accessory should be as low as possible.

The object was achieved by an accessory having the features of claim 1.

The accessory comprises a base and a sliding part movable in a straight line relative to the base. The sliding part is substantially rigid. The base has a first guide unit and the sliding part has a second guide unit, the first guide unit and the second guide unit interacting such that it is possible to move the sliding part between a first end position and a second end position.

One guide unit has at least one first bearing, which is at the front in the movement direction of the sliding part, and at least one rear second bearing and the other guide unit has at least one first guide bar, which is at the front in the movement direction, and one rear second guide bar. The first bar is guided in the first bearing and the second bar is guided in the second bearing. During the movement of the sliding part between the first end position and the second end position, the first bearing and the second bearing move relative to the first guide bar and the second guide bar. The guide unit constitute forced guidance, since the bearings are always the same distance from one another because they are arranged in the bearing seats. Therefore, precisely one bearing position of the second bearing on the second guide bar is on each bearing position of the first bearing on the first guide bar.

The first guide bar extends in a straight line along a first longitudinal axis and the second guide bar extends in a straight line along a second longitudinal axis. At least one of the longitudinal axes, the first longitudinal axis and/or the second longitudinal axis, forms, together with a third longitudinal axis, which extends through a first bearing point of the first bearing and through a second bearing point of the second bearing, an angle not equal to 0°, i.e. it is not parallel to the third longitudinal axis.

One advantage of the invention is that, owing to the arrangement of the first and second longitudinal axis relative to one another and the angle of greater than or less than 0°, i.e. the inclination of the first longitudinal axis and the second longitudinal axis relative to the third longitudinal axis, the sliding part assumes different positions relative to the base part when moving between the first end position and the second end position, it being possible for said sliding part to undergo an angular change during movement.

For example, the accessory comprises two first bearings and two second bearings as well as two first bars and two second bars. For example, the first bearings are spaced apart from one another and the second bearings are spaced apart from one another. The spacing is formed transversely to a movement direction, for example. Therefore, the first bars and the second bars are likewise spaced apart from one another. The sliding bearing described in the patent application having the official file reference DE 10 2019 130 253 can be used as the bearing, for example, the disclosure of which is incorporated into the present application in its entirety.

In a simple embodiment, the first longitudinal axis and the second longitudinal axis are parallel to one another and are at an angle to the third longitudinal axis. The sliding part then moves in a front region and a rear region equally in the same direction, i.e. in the direction x and in the direction z. In this case, an outer surface of the sliding part is in the same angular position relative to the base in all the positions between the first end position and the second end position.

In another embodiment, the first longitudinal axis and the second longitudinal axis are arranged at an angle to one another. This means that the first longitudinal axis and the second longitudinal axis are at different inclinations or, in other words, different angles relative to the third longitudinal axis. In this case, when the sliding part moves in the x direction, a region of the sliding part, either the front region or the rear region, is moved further in the z direction than the other region.

For example, a contact surface of the sliding part is inclined in the first end position and is approximately horizontally oriented in the second end position. If, for example, one longitudinal axis is inclined and the other longitudinal axis is approximately horizontally oriented, one region of the sliding part moves approximately horizontally in the x direction while the other region moves upward or downward in the z direction. For example, one longitudinal axis can slope upward in a ramp-like manner in the movement direction between the first end position and the second end position, while the other longitudinal axis is approximately horizontally oriented.

If, for example, the x coordinates and the y coordinates in the first end position and the second end position are set for the rear region of the sliding part, these coordinates can be linked to the first longitudinal axis. The second longitudinal axis can be constructed by a circle being drawn in the rear end position around the center of the first bearing in the first end position and in the second end position and the desired inclination of the sliding part being set in these positions.

According to an embodiment, at least one bearing is arranged in a bearing seat of the sliding part. In this case, the bearing can be mounted in the bearing seat in a simple manner.

In one configuration, the bearing is mounted so as to be pivotable within the bearing seat. In this way, it is possible for the bearing to be adapted to the angular position of the guide bar in the relevant position of the sliding part. Here, too, reference is made to the application having the file reference DE 10 2019 130 253, the disclosure of which is intended to be incorporated into the disclosure of this application in its entirety. The pivotable sliding bearing disclosed in this application is taken into consideration for this application as a pivotable bearing. This sliding bearing is formed such that a linear guide bar can slide in two opposite directions relative to the sliding bearing on a guide path predetermined by the sliding bearing. The sliding bearing is formed such that it can be received so as to be pivotable in a bearing seat, such that the guide bar can be moved in different directions during its movement by the bearing as part of the rotation of the bearing.

Alternatively, however, other sliding bearings are also taken into consideration which, at least within a defined angle, allow the sliding bearing to pivot relative to a bearing seat having a corresponding shape.

According to a configuration of the invention, the bearing has a circular cylindrical lateral surface at least in regions and the bearing seat interacting with the lateral surface is circular cylindrical at least in regions relative to the receptacle of the bearing rotatable about a center. In this way, the bearing can at least rotate over an angular range which makes it possible for the sliding part to move between the first end position and the second end position. For example, the bearing seat and the bearing have good sliding properties, such that it is possible for the bearing to move in the bearing seat.

The bearing is for example formed by a sliding bearing or a roller bearing; however, any suitable bearings can be used.

For example, the guide bars are on the base part and the bearings are on the sliding part. Alternatively, the guide bars are on the sliding part and the bearings are on the base part. The guide bars are for example immovably fastened to the base part or the sliding part or are formed in one piece therewith. The bearings are in turn for example pivotably mounted such that the entire guide surface can pivot. The bearing surfaces of the bearing are for example spaced apart from the center of rotation of the bearing.

The sliding part can for example be locked in at least one position by a latch. The latch has a first locking formation on the base part and second locking formation on the sliding part. For example, one locking formation is formed by a movable, for example pivotable, latch and the other locking formation is formed by corresponding recesses in which the latch can engage in the corresponding position. When the latch is in engagement with a recess, the latch is in the latched position and when the latch is out of engagement with a recess, the latch is in the released position.

Alternatively, other locks could also be used, for example frictional locking formation. One locking formation could for example be formed by at least one clamping jaw, in particular by two clamping jaws, and the other locking formation could be formed by a clamping rail that interacts with the clamping jaw and is formed such that it can be brought into clamping engagement with the clamping jaw in certain positions of the sliding part. In this way, stepless locking is also possible if the clamping engagement can be established in any position of the sliding part.

As another alternative, the locking could for example involve first locking formation in the form of at least one detent spring and second locking formation in the form of a mating contour, in which the detent spring can engage in a form-fitting manner.

The invention does not come down to the manner of the locking, however.

By an actuating device, the latch can be moved1 between the latched position and the released position, for example. The actuating device for example has a handle, using which the user can actuate the latch. The handle is for example formed by a pivotable lever. The handle may for example be retained on a front end of the sliding part. For example, a movement-transmitting device is provided that transmits movement of the handle to the latch over a distance.

Embodiments of the invention are described by way of example in the following description of the figures, also with reference to the drawings. Here, for the sake of clarity, even if different embodiments are involved, identical or comparable parts or elements have been denoted by identical reference signs, sometimes with the addition of lower case letters.

Features that are only described in relation to one embodiment can also be provided in any other embodiment of the invention within the scope of the invention. Even if they are not shown in the drawings, such amended embodiments are covered by the invention.

All the features disclosed are essential to the invention per se. The content of the disclosure of the associated priority documents (copy of the previous application) and the cited documents and the prior art devices described are hereby incorporated into the disclosure of the application in their entirety, also for the purpose of incorporating individual features or a plurality of features of these documents into one or more claims of the present application.

Figure 2:
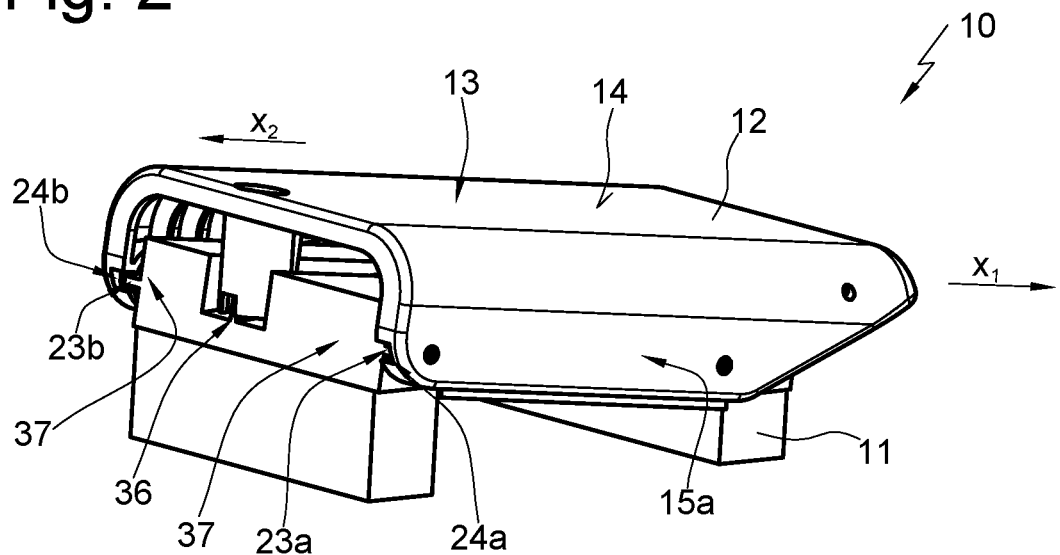
Figure 3:
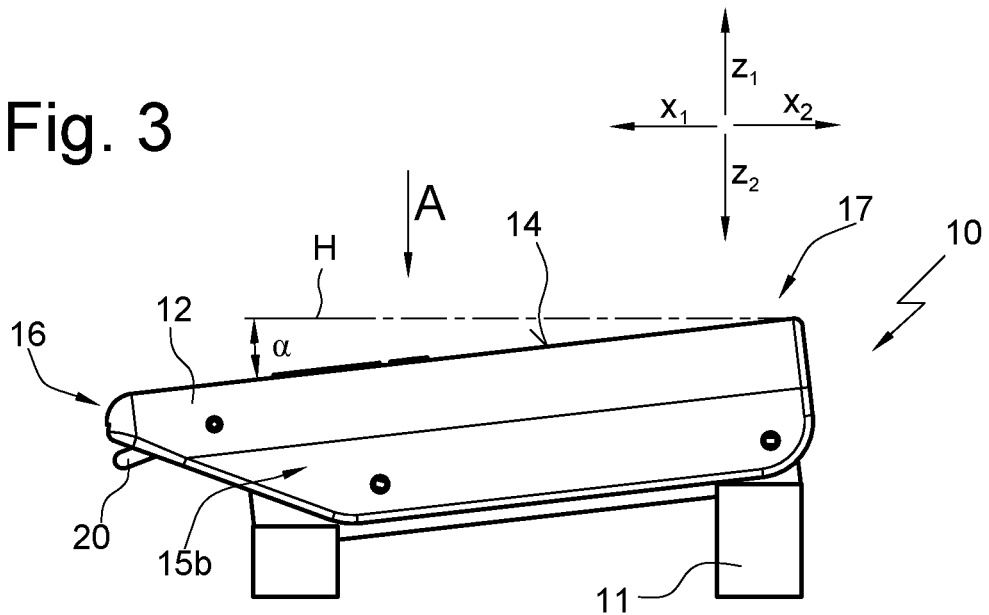
Figure 4:
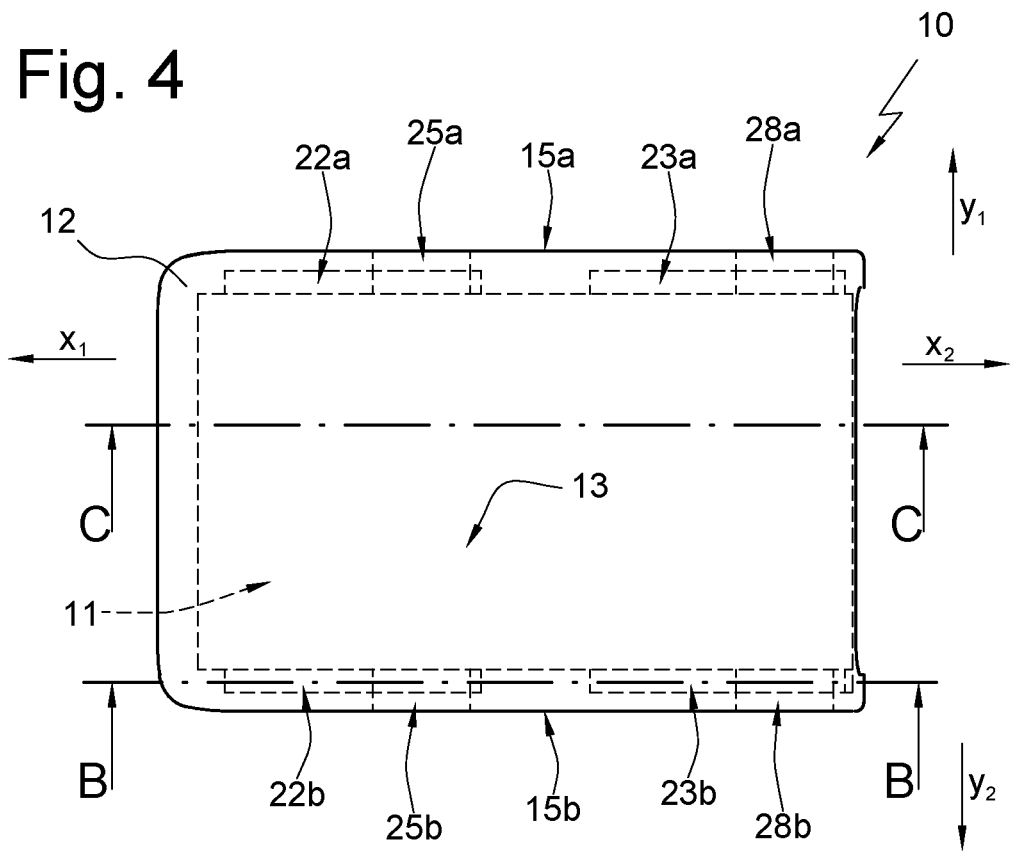
Figure 5A:
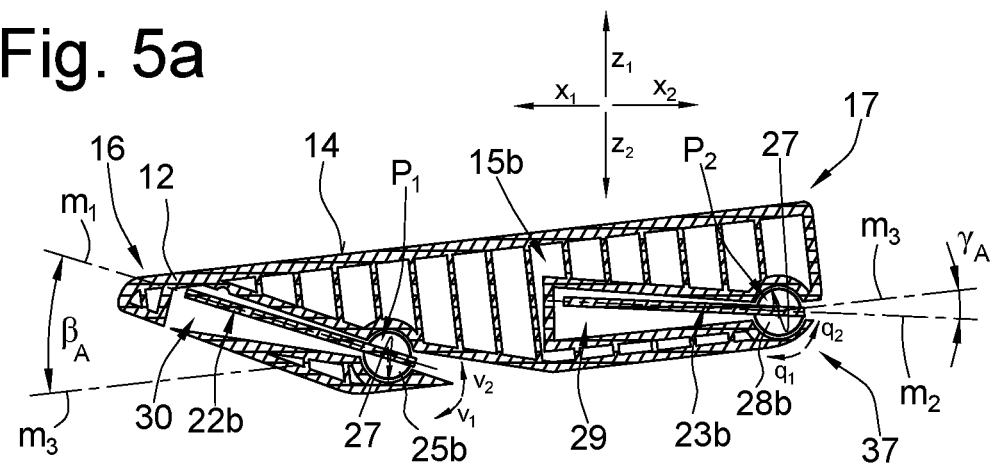
Figure 5B:
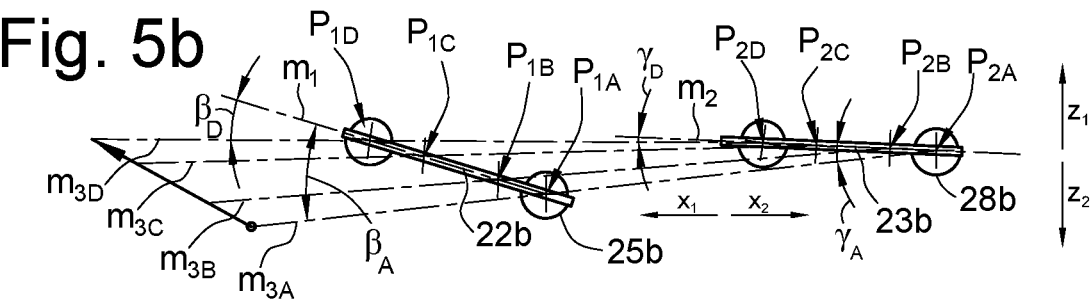
Figure 6:
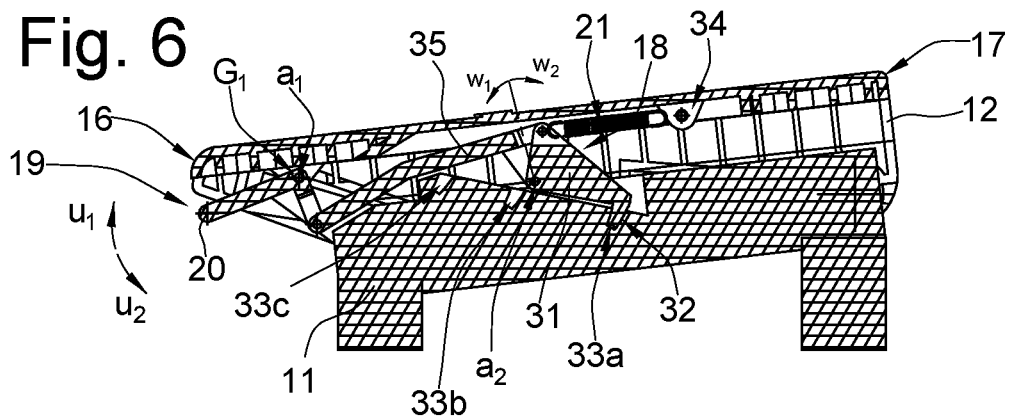
Figure 7:
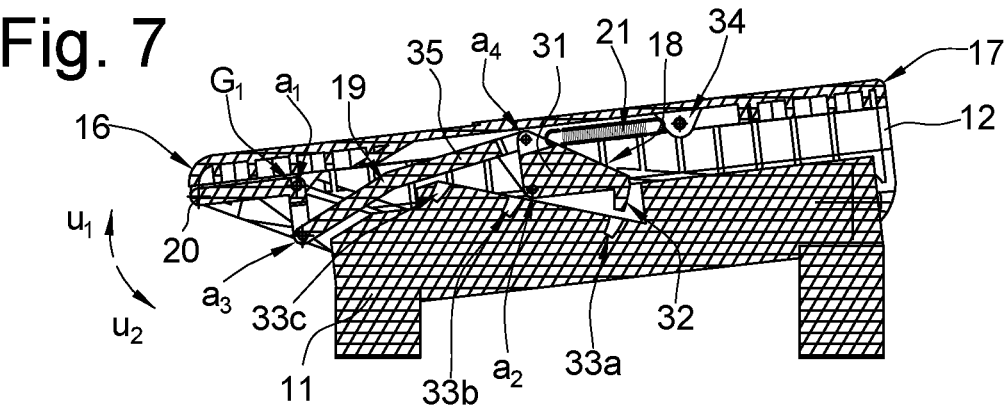
Figure 8:
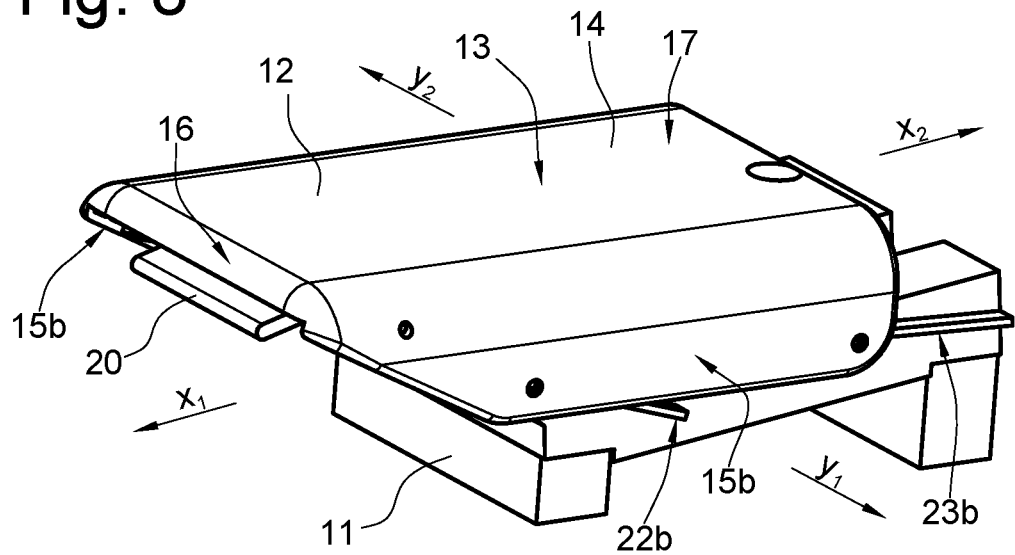
Figure 9:
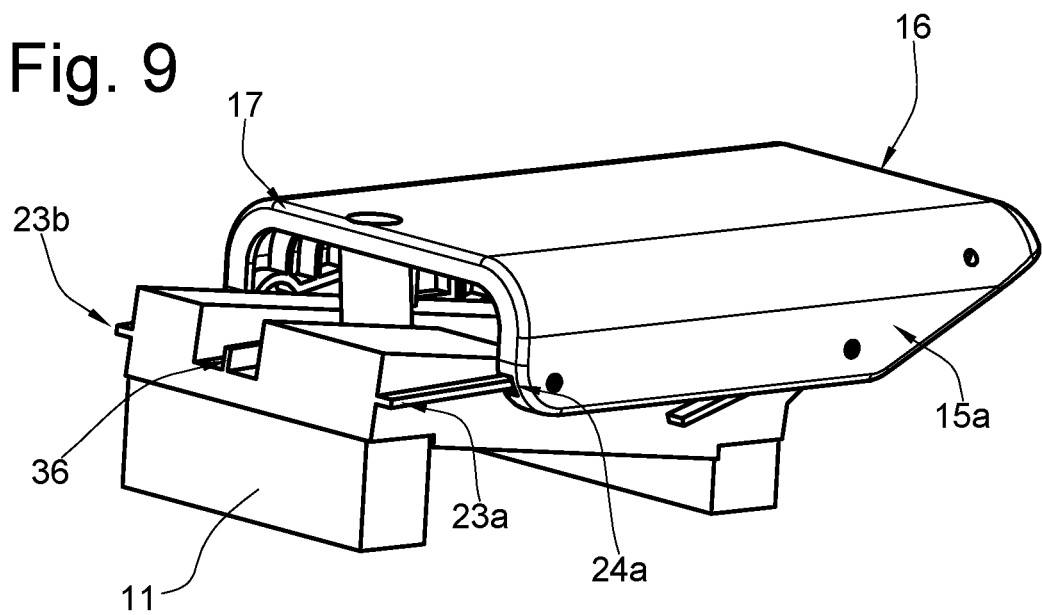
Figure 10:
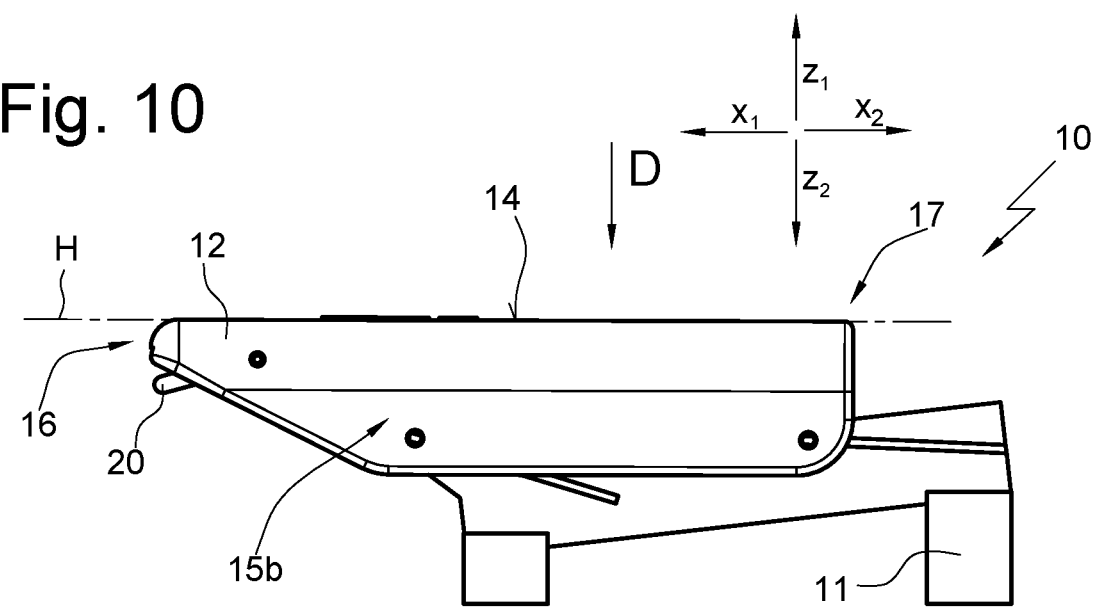
Figure 11:
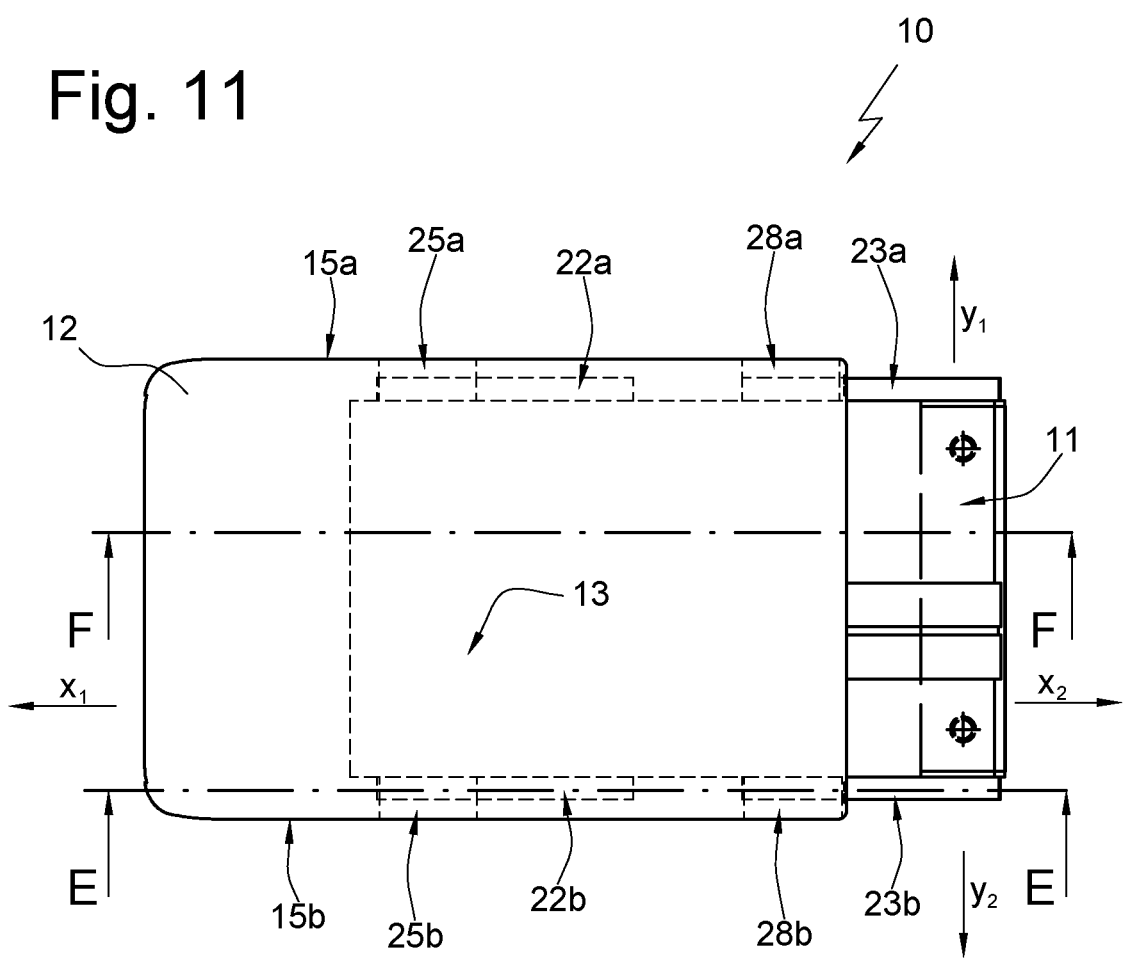
Figure 12:
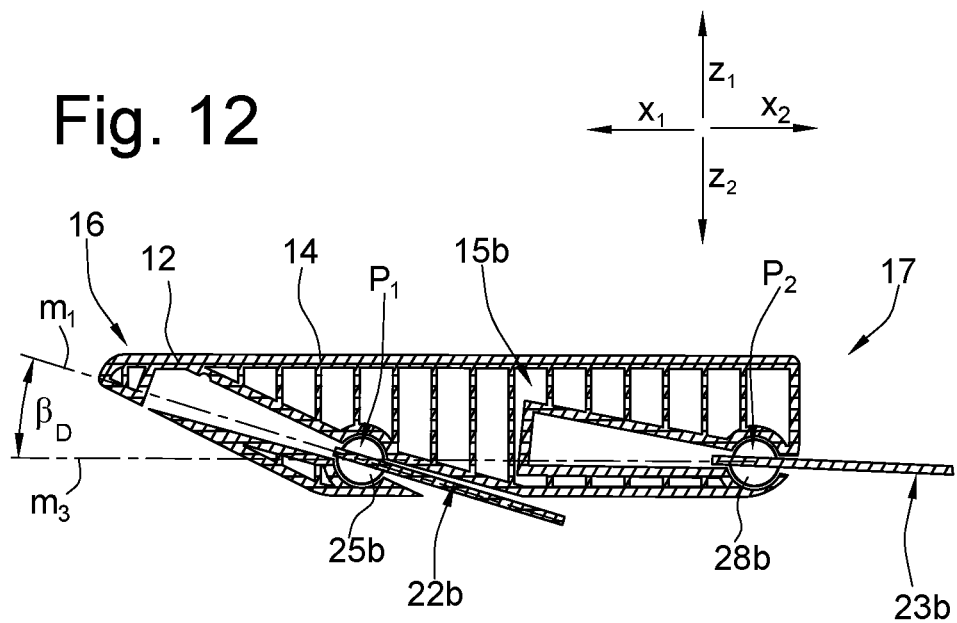
Figure 13:
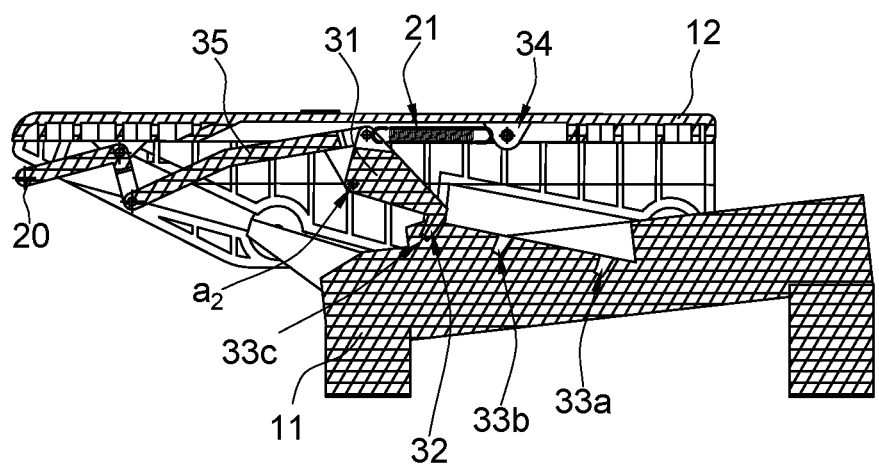
Figure 14:
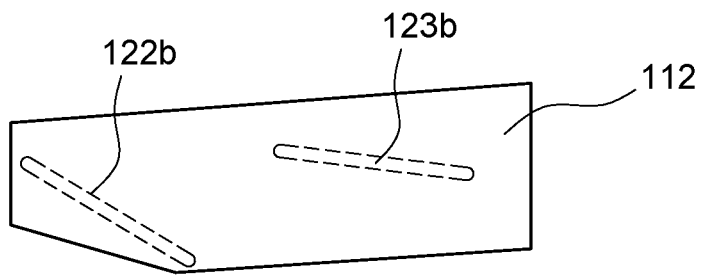
Figure 15:
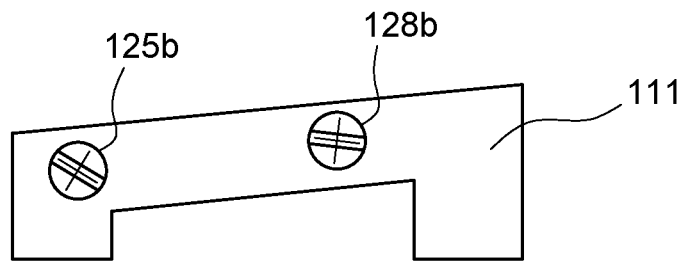
Figure 16:
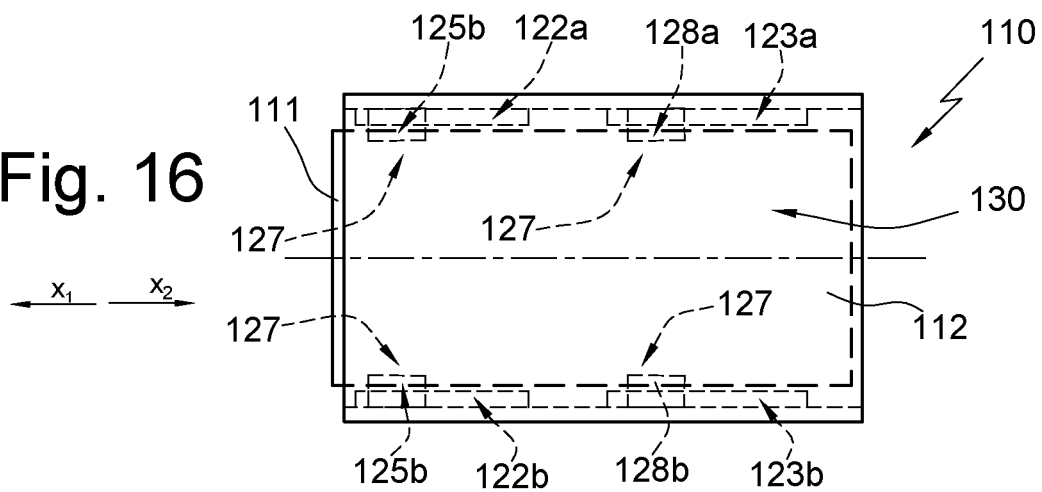
Figure 17:
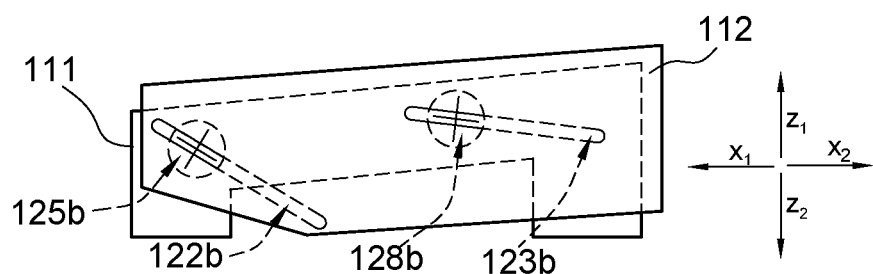
Figure 18:
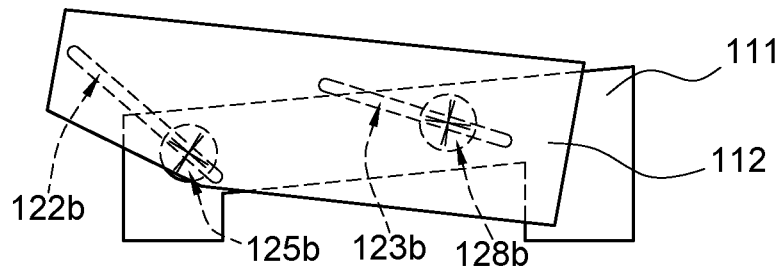

Other advantages become apparent on the basis of the description of an embodiment schematically described in the drawings where:

FIG. 1 is an oblique perspective front view of an accessory in the form of an armrest, FIG. 2 is an oblique perspective rear view of the armrest, FIG. 3 is a side view of the armrest, FIG. 4 is a plan view from the direction of the arrow A in FIG. 3, with padding of an arm support of the armrest having been omitted for the sake of clarity, FIG. 5*a* is a sectional view along sectional line B-B in FIG. 4, FIG. 5*b* is a schematic view of the first bearing and the second bearing relative to the first guide bar and the second guide bar in four different positions of the sliding part, including the first end position and the second end position, FIG. 6 is a sectional view along sectional line C-C in FIG. 4, FIG. 7 is a sectional view based on FIG. 6, in which the latch is in a released position, FIG. 8 is a perspective view based on FIG. 1, in which the arm support is in the front end position, FIG. 9 is an oblique perspective rear view of the armrest according to FIG. 8, FIG. 10 is a side view of the armrest, in which the arm support is in the front end position, FIG. 11 is a plan view from the direction of the arrow D in FIG. 10, FIG. 12 is a sectional view along sectional line E-E in FIG. 11, FIG. 13 is a sectional view along sectional line F-F in FIG. 11, in which the latch is in the latched position, FIG. 14 is a side view of the arm support of an armrest according to a second embodiment, in which the arm support has the guide bars, FIG. 15 is a side view of the base of an armrest according to a second embodiment comprising bearing seats formed thereon and bearings that are pivotably retained in the bearing seats, FIG. 16 is a plan view of the armrest, in which the arm support is in the rear position, FIG. 17 is a side view of the armrest according to the second embodiment in the rear first end position, in which the bearings and the guide bars are shown by dashed lines, FIG. 18 shows the armrest based on FIG. 16, with the arm support being in the front second end position.

The armrest as a whole is denoted by reference sign 10 in the drawings.

According to FIG. 1, the armrest has a base 11 and an arm support 12 movable relative to the base 11. The arm support 12 can be moved relative to the base 11 between a rear first end position as shown in FIG. 3 and a front second end position shown in FIG. 10. The arm support 12 is approximately U-shaped and has a central arm-support region 13 comprising an arm-support surface 14 and lateral guide regions 15a and 15b. The arm support 12 has a front end 16 and a rear end 17.

FIG. 2 shows that the base 11 has projecting guide bars 23a and 23b of a guide device 37 on either side. Furthermore, it shows a guide bar 36 projecting upward in the direction $z_1$, which is not discussed in greater detail here. In addition, recesses 24a and 24b can be seen in the arm support 12 for receiving the guide bars.

When moving between the first end position and the second end position, the arm support 12 performs both a movement in the direction $x_1$ or $x_2$ and a movement in the direction $z_1$ or $z_2$ (see FIG. 3). While the arm-support surface 14 forms an angle α relative to a horizontal H in the first end position (see for example FIG. 3), the arm-support surface 14 is formed to be approximately parallel to the horizontal H in the second end position (see for example FIG. 10).

FIG. 4 is a plan view of the armrest 10, in which the base 11 together with its first guide bars 22a and 22b and its second guide bars 23a and 23 is shown by dashed lines for better understanding of the armrest 10. The first bearings 25a and 25b and the second bearings 28a and 28b of the arm support 12 are shown by dashed lines in order to indicate their position, despite them not actually being visible in the plan view. The guide bars 22a, 22b, 23a and 23b and the bearings 25a, 25b, 28a, 28b are part of the guide device, which determines the position of the arm support 12 relative to the base 11 in any position between the rear end position and the front end position.

The armrest 10 has no degrees of freedom in relation to the directions $y_1$ and $y_2$ due to the design and arrangement of the bearings 25a and 25b as well as 28a and 28b, such that the arm support 12 cannot be moved in these directions. The arm support 12 can be moved in the directions $x_1$ and $x_2$ as well as $z_1$ and $z_2$ as part of the movement path predetermined by the guide bars 22a, 22b, 23a, 23b.

The sectional view according to FIG. 5a shows the guide bars 22b and 23b of the base 11. Moreover, the base 1 is not shown in FIG. 5a. In addition, the guide region 15b of the arm support 12 is shown. Bearing seats 27 in which sliding bearings 25b and 28b are arranged are formed in the guide region 15b. In the same way, in the guide region 15a, the bearing 25a interacts with the guide bar 22a and the bearing 28a interacts with the guide bar 23a. FIG. 5a also shows that a recess 29 for the guide bar 23b and a recess 30 for the guide bar 22b are formed in the arm support 12.

The bearing 25b is linearly movably guided on the guide bar 22b and the bearing 23b is linearly movably guided on the guide bar 28b, in opposite directions. Since the bearings 25b and 28b are rotatable relative to the arm support 12 in the bearing seats 27 but a center $P_1$ of the bearing 25b and a center $P_2$ of the bearing 28b are always in the same position relative to the arm support, forced guidance is formed, i.e. precisely one position of the point $P_2$ is on each position of the center $P_1$. In the rear position of the arm support 12 according to FIG. 5, a first center line $m_1$ of the guide bar 22b has an angle β to a straight line $m_3$ connecting the points $P_1$ and $P_2$. In this position of the arm support 12, a second center line $m_2$ of the guide bar 23b has an angle γ to the straight line $m_3$.

It can be seen that the angle β formed between the straight line $m_3$ and the longitudinal axis $m_1$ is greater than the angle γ formed between the straight line $m_3$ and the longitudinal axis $m_2$. Therefore, when the arm support 12 is moved out of the first end position in the direction $x_1$, the front end 16 is moved further in the direction $z_1$ than the rear end 17 of the arm support 12. In this case, the angles β and γ change during movement between the rear and the front end position.

During movement of the arm support 12 between the rear end position and the front end position, the bearings 25a, 25b move relative to the bearing seats 27 in the pivoting direction $v_1$ or $v_2$ and the bearings 28a, 28b move relative to the bearing seats 27 in the pivoting directions $q_1$ or $q_2$.

It can be seen that different movement characteristics can be produced by the differing arrangement of the first guide bar 22a and the second guide bar 23a relative to one another (the guide bar 22b is spaced apart from and parallel to the guide bar 22a and the guide bar 23b is spaced apart from and parallel to the guide bar 23a) and by the selection of the angles β and γ.

FIG. 5b shows the straight line $m_3$, which shows the movement properties of the arm support 12 in the present embodiment, for each of four different positions A, B, C, D of the bearing 25b relative to the guide bar 22b and of the bearing 23b relative to the guide bar 23b. In the rear first end position of the arm support, which is denoted by an "A" being added, the bearing 25b and the bearing 28b have the positions $P_{1A}$ and $P_{2A}$ and the straight line $m_3$ has the position $m_{3A}$. The angles α and γ are likewise denoted by an "A" being added. In the front second end position of the arm support 12, the bearing 25b and the bearing 28b have the positions $P_{1D}$ and $P_{2D}$ and the straight line $m_3$ has the position $m_{3D}$. The angles α and γ have a "D" added. The positions B and C are shown therebetween.

While the arm support 12 is moving in the rear end 17 substantially in the direction $x_1$ and only slightly in the direction $z_1$ (the straight lines $m_3$ are close to one another in the direction $z_1$), considerable movement takes place in the direction $z_1$ in the front end 16 of the arm support 12. As is apparent when comparing FIGS. 3 and 10, the front end 16 is raised when moving between the first and the second end position of the arm support 12. According to FIG. 10, the angle α is 0°.

The armrest further has a latch 18 (see FIGS. 6 and 7), which can be moved between a latched position and a released position. In the latched position, the arm support 12 is immovably locked, and in the released position the arm support 12 can be moved between the rear end position and the front end position in the directions $x_1$ and $x_2$. An actuating device 19 can shift the latch 18 between the latched position and the released position. The actuating device has a handle 20 mounted so as to be easily accessible to a user on the front end 16 of the arm support 12 and serving to manually move the latch 18 between the latched position and the released position.

The latch 18 is urged into the latched position by a spring 21. The handle 20 is pivotably mounted on the arm support 12 and moves the latch 18 into the released position by a pivoting movement about a pivot axis $a_1$ formed by the pivot joint $G_1$ in the direction $u_1$.

The sectional view according to FIG. 6 shows the latch 18 and the actuating device 19. The latch 18 has a latch 31 mounted so as to be pivotable in the directions $w_1$ and $w_2$ about a pivot axis $a_2$ by a pivot joint $G_2$. The latch 31 has a projection 32 for engaging in one of several recesses 33a, 33b and 33c in the base 11. When the projection 32 is arranged in one of the recesses 33a, 33b or 33c (see for example FIG. 6), the latch 18 is in the latched position. When the projection 32 is out of engagement with all of the recesses 33a, 33b or 33c, the latch 18 is arranged in the released position (see for example FIG. 7).

The spring 21 is fastened to a fastening structure 34 of the arm support 12 by one end and to the latch 31 by another end such that a moment is generated about the pivot axis $a_2$ in the direction $w_2$. The spring 21 is in the latched position under pre-load.

A movement-transmitting device 35 in the form of a link is articulated to the handle 20 by a pivot joint having the pivot axis a3 and is articulated to the latch 31 by a pivot joint having the pivot axis a4 such that pivoting the handle 20 in the direction $u_1$ results in a pivoting movement of the latch 31 counter to the spring force of the spring 21 in the direction $w_1$. In the process, the projection 32 moves out of the recess 33a into the released position according to FIG. 7.

The released position is shown in FIG. 7. In the released position, the arm support can be moved in the direction $x_1$ toward the front second end position. Once the force on the handle 20 has been released, the latch 31 is moved in the direction $w_2$ by the spring force of the spring 21, the handle 20 being pivoted in the direction $u_2$ by the movement transmitter 35. If the arm support 12 was for example moved into the second end position (see FIG. 8 to 13) and the force on the handle 20 was then relieved, the projection 32 would come into engagement with the recess 33c (see FIG. 13). The arm support 12 is then in the latched position again, and therefore any further movement is prevented.

When moving back into the first end position, the arm support is moved in the directions $x_2$ and $z_2$.

A second embodiment of the accessory according to the invention in the form of an armrest 110 differs from the first embodiment only in relation to the guide device 130. In this embodiment, the arm support 112 has a first guide bars 122a and 122b as well as rear guide bars 123a and 123b (see FIGS. 14 and 16). The base 111 has a first sliding bearings 125a and 125b as well as second sliding bearings 128a and 128b. When moving between the first end position and the second end position, the sliding bearings 125a and 125b slide on the guide bars 122a and 122b and the sliding bearings 128a and 128b slide on the guide bars 123a and 123b. The bearings 125a, 125b, 128a and 128b are received so as to be rotatable in the bearing seats 127 of the base 111. In this embodiment too, in the same angular position of the guide bars 122a and 122b as well as 123a and 123b, the arm support 112 performs the same movement as in the first embodiment.

The invention claimed is:

1. An accessory comprising:
   a base;
   a sliding part movable translationally relative to the base between a first end position and a second end position;
   a first guide unit on the base; and
   a second guide unit on the sliding part, one of the guide units having a first bearing and a second bearing at least one of which is pivotal in a respective bearing seat, the other guide unit having a first guide bar and a second guide bar spaced apart in a movement direction and movable jointly in the movement direction relative to the respective first and second bearings, the first guide bar extending in a straight line along a first longitudinal axis and the second guide bar extending in a straight line along a second longitudinal axis, the first longitudinal axis and/or the second longitudinal axis extending at an angle to a straight line extending through a center of the first bearing and a center of the second bearing.

2. The accessory according to claim 1, wherein there are two spaced-apart first bearings and two spaced-apart second bearings as well as two first bars and two second bars.

3. The accessory according to claim 1, wherein the first longitudinal axis and the a second longitudinal axis are parallel to one another.

4. The accessory according to claim 1, wherein the a first longitudinal axis and the second longitudinal axis together form an angle greater than or less than 0°.

5. The accessory according to claim 1, wherein the one bearing has an at least partly circular cylindrical or spherical outer surface, the bearing seat being complementarily shaped.

6. The accessory according to claim 1, wherein the one bearing is a sliding bearing or a roller bearing.

7. The accessory according to claim 1, wherein the guide bars are on the base and the bearings are on the sliding part, or the guide bars are on the sliding part and the bearings are on the base.

8. The accessory according to claim 1, further comprising:
   a latch for locking the sliding part in position on the base.

9. The accessory according to claim 8, further comprising:
   an actuating device for moving the latch between a latched position with the sliding part fixed on the base and a released position movable relative to the base.

10. The accessory according to claim 1, wherein the accessory is an armrest, a console or a table having a movable panel.

* * * * *